United States Patent [19]

Viland

[11] 3,747,800
[45] July 24, 1973

[54] PREVENTING AIR POLLUTION AND IMPROVING SAFETY OF AUTOMOBILE AND SIMILAR TANKS

[76] Inventor: Clare Kenneth Viland, P.O. Box 284, Bodega Bay, Calif. 94923

[22] Filed: Feb. 16, 1971

[21] Appl. No.: 115,245

[52] U.S. Cl................ 220/85 B, 220/63 A, 222/95
[51] Int. Cl............................................ B65d 25/00
[58] Field of Search............. 220/85 B, 63 A, 86 R; 222/95, 386.5

[56] References Cited
UNITED STATES PATENTS

| | | | |
|---|---|---|---|
| 2,010,445 | 8/1935 | Sparks | 220/86 R |
| 2,299,611 | 10/1942 | Clark | 220/85 B UX |
| 2,347,379 | 4/1944 | Teeter | 220/85 B UX |
| 2,416,231 | 2/1947 | Smith et al. | 220/63 A UX |
| 2,758,747 | 8/1956 | Stevens | 220/63 R |
| 3,083,875 | 4/1963 | Welty et al. | 222/95 |
| 3,464,584 | 9/1969 | McNally | 220/86 R |
| 2,477,611 | 11/1969 | Niles | 220/86 R |

FOREIGN PATENTS OR APPLICATIONS

| | | | |
|---|---|---|---|
| 1,109,506 | 9/1955 | France | 220/85 B |
| 559,556 | 9/1932 | Germany | 220/86 R |

*Primary Examiner*—Herbert F. Ross
*Assistant Examiner*—James R. Garrett
*Attorney*—Owen, Wickersham & Erickson

[57] ABSTRACT

An evaporation-proof and crash-resistant gasoline tank for automobiles. A flexible light-oil-resistant inner tank has an upper portion above the tank's mid-section acting as a diaphragm and may be tightly attached to the mid-seam that connects the upper and lower halves of a conventional tank, the bottom half of the inner tank remaining in place lining the outer tank at all times. The top half of the inner tank is also tightly attached around the tank's fuel inlet-pipe, and guide rods extend down from the end of the fuel inlet-pipe vertically into the tank to the bottom of the outer tank, to keep the flexible diaphragm from interfering with fuel entering the tank. An air vent at the top of the tank enables air to enter or to be expelled when temperature changes occur and when the tank is being filled or emptied. The gasoline-resistant diaphragm fits against the sides and top of the tank when the tank is full and against the sides and bottom when the tank is empty.

5 Claims, 5 Drawing Figures

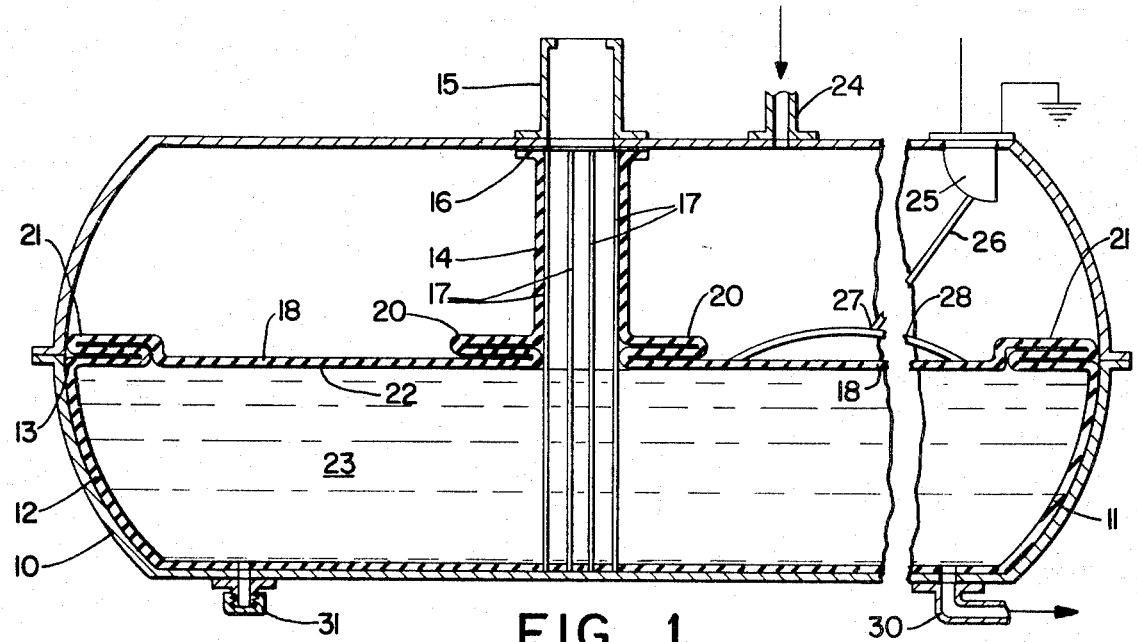
FIG_1
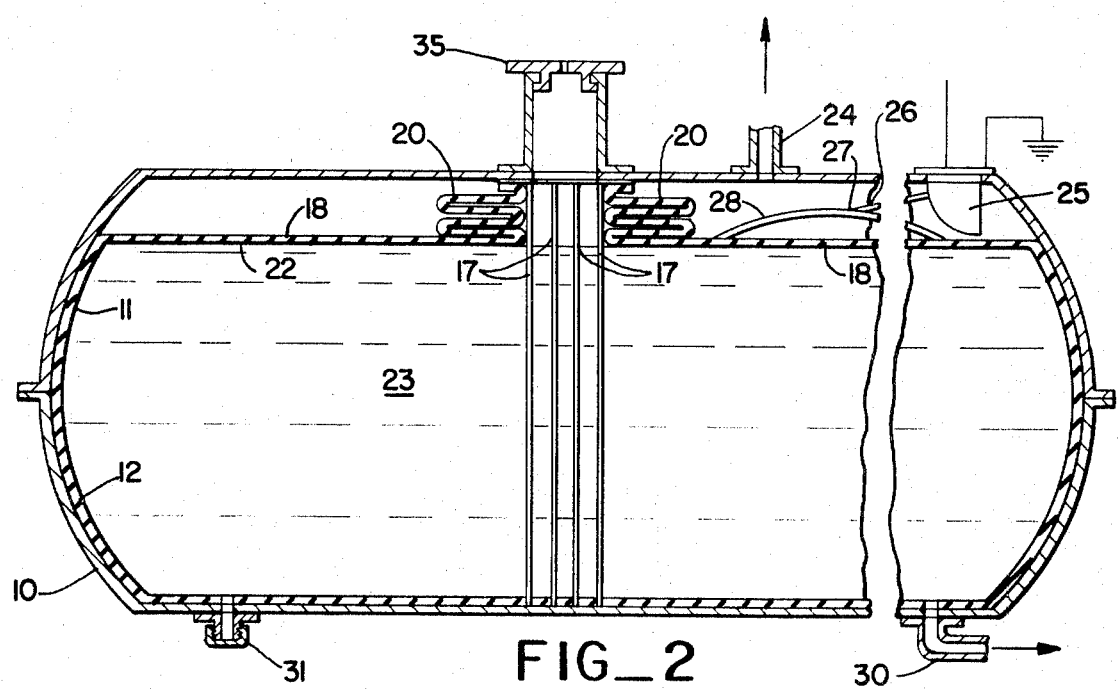
FIG_2
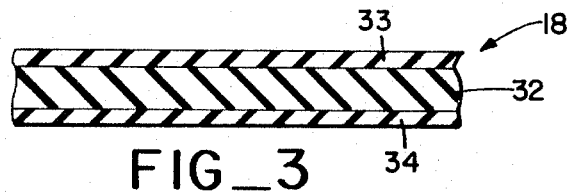
FIG_3
INVENTOR.
CLARE KENNETH VILAND

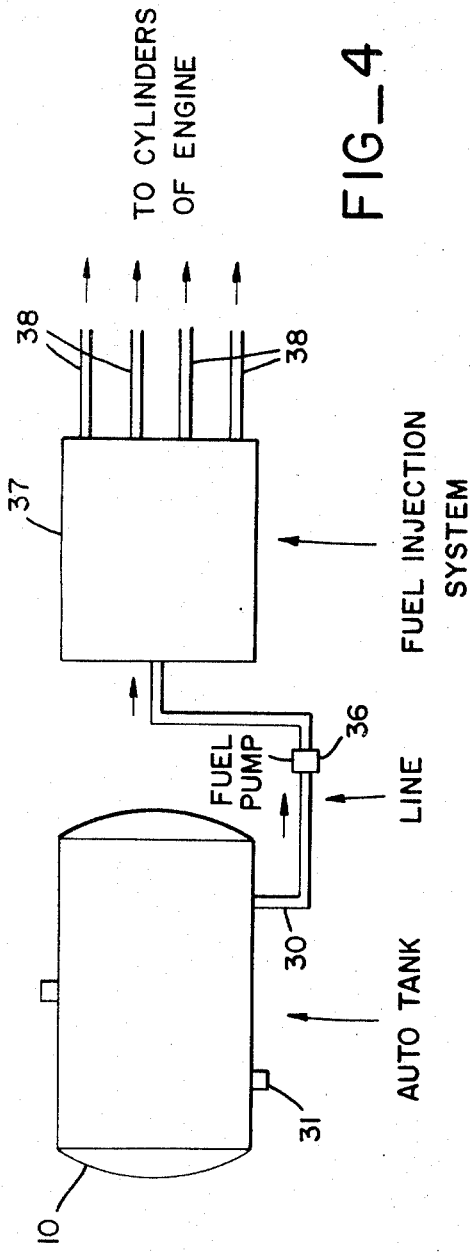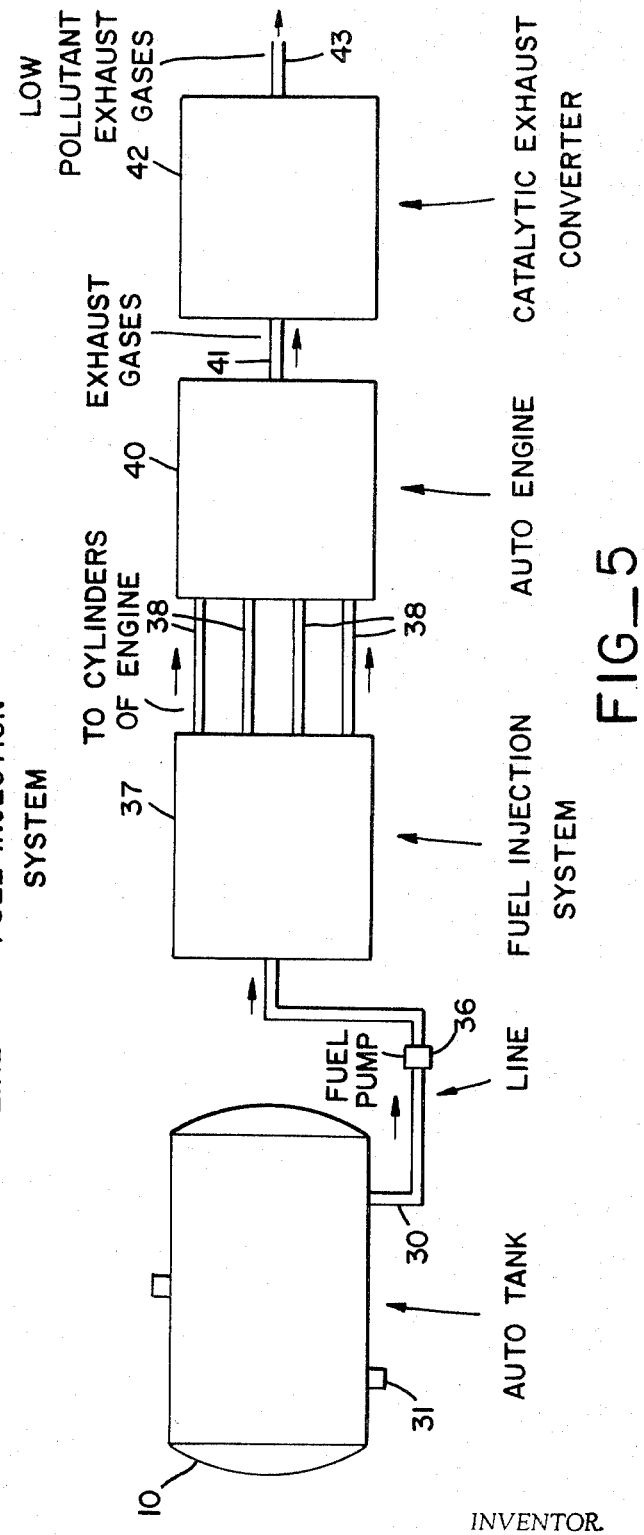

PREVENTING AIR POLLUTION AND IMPROVING SAFETY OF AUTOMOBILE AND SIMILAR TANKS

BACKGROUND OF THE INVENTION

This invention relates to the fields of both air pollution and vehicle safety. Specifically, it relates to method and apparatus for preventing displacement and evaporation losses when the fuel-tank of an automobile is being filled, for preventing normal fuel-tank "breathing" losses due to changes in temperature, and also for preventing other types of hydrocarbon losses in the normal operation of an automobile. In addition, it provides safety in case of accidental puncture of the fuel tank, — a safety feature not present in conventional automobile fuel tanks.

It is well-known that "smog," now a major problem in most metropolitan areas, is presently attributable about 60 percent or more to the automobile population. Automobiles powered by the internal combustion engine emit into the atmosphere unburned hydrocarbons, which react with nitrogen oxides and carbon monoxide in the atmosphere under the influence of sunlight to cause a typical smog blanket. The nitrogen oxides and the carbon monoxide are produced in part from the automobile, but also come from industry, homes, and other sources of combustion of common fuels with air.

It is not so well known that when a motorist stops to refuel and takes typically, about 7½ U. S. gallons, that means that 7½ gallons of gasoline vapor are displaced from the automobile's gasoline tank into the atmosphere during the refueling. Additionally, there is an equal evaporation loss due to agitation of the fuel, which may be warmer than the ambient temperature. This means that about 15 gallons of vapor or 2 cubic feet of vaporized gasoline is lost to the air, and this is equal to around two-thirds pint of liquid or more than 350 grams of hydrocarbons per filling.

Both Federal and California auto-emission laws for 1970–1972 permit not more than 2.2 grams of unburned hydrocarbons per vehicle miles driven. This emission standard under present laws must be reduced to 0.5 grams by 1975, or possibly by 90 percent or to 0.22 grams by such time, if laws presently under consideration are enacted.

The device of this invention if installed in gasoline tanks of automobiles, should greatly reduce the loss of hydrocarbons into the air. If installed on new vehicles when manufactured, along with electronic or other types of fuel-injection in place of carburetors and the costly evaporation control systems now used, and using only simple other emission control devices, not only would the overall emission control be improved, but equal or even lower total manufacturing costs for the vehicle should result.

The device of this invention, when combined with fuel-injection and the use of catalytic-exhaust-converters, not only provides a better and more economical means of controlling undesirable auto emissions than do present methods, but also tends to reduce the load on the catalytic-exhaust-converters and relieve the excessive heat that may damage them. Load is relieved on the catalytic-exhaust-converter especially during acceleration and idling, as compared to operation with presently commonly used evaporation control systems, such as absorption and desorption of hydrocarbon vapors with activated charcoal both at the carburetor and at the gasoline tank. Part of these vapors pass through the carburetor and become air-pollutants through incomplete combustion.

SUMMARY OF THE INVENTION

Briefly, a preferred form of my invention comprises a combination of the following elements:

1. An inner tank constructed of a flexible material resistant to gasoline and to light oil. A suitable material is neoprene rubber and any of several plastics. The inner tank may be attached tightly to the side walls of a conventional gasoline tank, preferably at the seam connecting the upper and lower halves of the tank. It is also tightly attached to the filler pipe at its inlet point. The upper half of the inner tank acts as a diaphragm and is formed in such a manner that when the tank is full, the diaphragm is forced up against the top of the tank, and when the gasoline tank is empty it rests on the tank's bottom. In effect, the diaphragm becomes the equivalent of a floating roof, such as is used in oil refineries to prevent losses of gasoline and light oil vapor and to protect the surface of the liquid contents from contact with air. The bottom half of the inner tank may be fixed in place if desired, with outlets at the bottom for withdrawing fuel.

2. An air vent at the top of the tank. This enables free movement of the diaphragm when the tank is being filled and as it empties while using its contents as fuel.

3. A liquid-level-sensing device. The float normally used is replaced by a guide-rail attached to the top of the diaphragm. The float end of the lever arm is held in place at the liquid level (above the diaphragm) by a sliding connection on the guide-rail.

The elements paragraphs 1, 2 and 3, may be used in combination with a fuel injection system that replaces the engine's carburetor or carburetors to form a complete evaporation control system. In addition, a positive crankcase ventilation device and a catalytic-exhaust-converter may be provided to give an overall low-emission control system, with regard to emissions of unburned hydrocarbons, carbon monoxide and nitrogen oxides.

Other objects and advantages of the invention will appear from the following description of some preferred embodiments.

BRIEF DESCRIPTION OF THE DRAWINGS

FIG. 1 is a diagrammatic view in elevation and partly in section of a tank embodying the principles of the invention. In this case, the tank is shown in the half-full condition.

FIG. 2 is a similar view with the tank filled with fuel.

FIG. 3 is an enlarged fragmentary cross-sectional view of the diaphragm.

FIG. 4 is a diagrammatic view of the combination of the tank with a fuel injection system.

FIG. 5 is a diagrammatic view of the combination of FIG. 4 in combination with an engine and a catalytic exhaust converter.

DESCRIPTION OF THE PREFERRED EMBODIMENT

FIG. 1 shows a gasoline tank embodying the invention. A typical automobile gasoline tank 10 is fitted with a flexible light-oil resistant and gasoline-resistant inner tank 11 made of neoprene rubber or some other gasoline-insoluble flexible plastic. The inner tank 11 has a lower portion 12 fastened tightly in the tank, preferably at the mid-seam 13, when assembling the tank. Similarly, the inner tank 11 has a tubular portion 14 tightly fastened around the end of a filler pipe 15 at a point 16 where the filler pipe 15 joins the tank 10. A series of guide rods (or strips) 17 may extend vertically from the point 16, to the bottom of the tank 10, being positioned to approximate the cross-sectional shape of the filler pipe 15. The upper portion of the inner tank 11 comprises a diaphragm 18 made to the shape of the top and upper wall surfaces of the tank 10 when filled, just as the lower portion 12 is made to the shape of the bottom and lower wall surfaces of tank 10 and the tubular portion 14 to the surface bounded by the guide rods 17, which in cross section is roughly the same as that of the inlet pipe 15.

Pleats 20 form in the diaphragm 18 around the filler pipe area, and pleats 21 form in the diaphragm 18 around the walls of the tank 10 to accommodate the level 22 of the liquid 23. Above the diaphragm 18 only air is contained, the air being admitted and expelled from a vent 24 at the top of the tank.

A fuel-level-sensing unit 25 with a movable arm 26 is attached to a guide-bar 27 placed on a guide-rail 28. The guide-rail 28 is securely attached to the diaphragm 18, thus providing, in effect, the equivalent of the usual float on the surface of the liquid fuel. Outlets for the fuel 23 are provided in the tank 10 at a line 30 leading to the fuel pump and engine, and at a drain-pipe and plug 31. The bottom lining material 12 is tightly attached around the outlets 30 and 31.

FIG. 2 shows the same tank 10, but in the nearly-full condition. When the tank 10 is full of gasoline or similar fuel, the diaphragm 18 is close to the top of the tank 10. In this position, the pleats 20 form only around the volume surrounded by the upper portions of guide rods 17. FIG. 2 also illustrates the use of a single layer of flexible gasoline-resistant neoprene rubber or suitable plastic in diaphragm 18. FIG. 2 further shows a vented fuel-tank-cap 35 in place. An unvented cap may be used if desired, as the vent 24 will suffice in most cases.

If the tank 10 were empty, no pleats 20 would appear around the walls or inlet volume enclosed by the guide-rods 17, for the diaphragm 18 would have dropped to the bottom of the tank 10.

The light-oil-resistant inner tank bottom half 12 may be loosely enclosed, except as noted, but also may be secured permanently in place or omitted entirely if desired, as only the top half 18 moves. Such omission would, however, reduce safety. The top half 18 should preferably be formed with accordion-like like pleats 20 around the tank mid-seam, and at the point it is fastened to the fill-pipe 15. In effect, the upper half 18 then becomes a "floating roof" as used in large oil refinery light-oil tanks, easily rising to the top when the tank 10 is filled and falling to the bottom when the tank 10 is emptied. Air displaces the tank volume above the diaphragm 18 as the gasoline level is lowered, and is expelled when the tank 10 is filled. Thus, there is no contact with air above the diaphragm 18, and no gasoline vapors are lost by displacement, or by "breathing" due to temperature changes.

The inner tank 11 may be constructed as a "sandwich," if desired, with the two outer sides 33 and 34 of thin flexible light-oil-resistant rubber or plastic, and the mid-layer 32 thereof filled with a thicker section of a type of rubber which absorbs fuel, swells and expands, thus becoming self-sealing and holding the fuel in the tank 10 in case of any ordinary puncture during an accident. This is a safety feature for preventing fire or explosion. However, the inner flexible tank 11 even if of single membrane design, positioned loosely within the outer tank 10, except as specified, is unlikely to rupture even though the outer tank 10 were to be bent or punctured in a collision.

The floating diaphragm-type inner-tank 11 may be combined with electronic or other fuel injection in lieu of conventional carburetion, thus providing a complete fuel evaporation control system, since the fuel supply is shut off during deceleration and when the car is stopped, — and this is the time when maximum emissions of unburned hydrocarbons occur. This combination will also provide better overall emission control for the vehicle and much of the present emission control system as well as the engine's carburetor can be omitted. The tank as described, fuel injection, simple positive crankcase ventilation and a catalytic-exhaust-converter should easily meet 1975 Government standards for emissions of carbon monoxide, nitrogen oxides, as well as for unburned hydrocarbons. This combination, should result in lowered manufacturing cost for a vehicle having better drivability and safety features, since it can replace the present many devices plus one or more expensive and complicated carburetors.

The same system may also be used in service station or similar storage tanks. In this application a preferred form would be similar to that of FIGS. 1 and 2, but the upper section of the inner tank 12 only, acting as a membrane or diaphragm, need be installed at its horizontal mid-section. Also, the liquid-level-sensing unit 25 and all appurtenances thereto may be omitted, including the guide-rail 28 attached to the membrane-diaphragm resting on the liquid's level.

FIG. 4 shows the tank 10 combined with a fuel injection system. The fuel line 30 leads to a fuel pump 36 and thence to a fuel injection system 37. During coasting and at other times when no fuel is being injected, the fuel pump 36 is closed down and no fuel flows through the fuel line 30. Thus the tank 10 cooperates with the fuel injection system 37 to reduce the production of smog-producing emissions.

FIG. 5 shows an even more complete system. Conduits 38 lead from the fuel injection system 37 to an automobile engine 40, and exhaust gases are piped through an exhaust conduit 41 to a catalytic exhaust converter where a catalyst, such as platinum metal catalyst mounted on a suitable high area carrier (e.g., activated alumina) may act on the exhaust gases. Other such catalysts, such as monel metal, may be used so long as they are suitable for completing or furthering the combustion of hydrocarbons and carbon monoxide in the presence of excess air and for decomposing oxides of nitrogen to elemental oxygen and nitrogen.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. Apparatus for preventing pollution of the atmosphere by hydrocarbon vapors, and of crash-safety for an automotive vehicle, including, in combination with a conventional fuel tank for an automotive vehicle, having an inlet pipe and outlet means, a flexible hydrocarbon-resistant inner tank having a lower portion tightly attached to the walls of a lower portion of said fuel tank, said inner tank being also fluid-tightly attached to the fuel tank's inlet pipe and outlet means, guide members encompassing the inlet area of the inlet pipe and extending vertically to and attached to the bottom of said tank, said inner tank portion having a flexible top diaphragm capable of fitting to the shape of both the top and the bottom of said tank, and to its upper and lower side walls, and to the volume below the fill pipe encompassed by said guide-rods, said inner tank diaphragm portion being capable of collapsing to the bottom of said fuel tank when empty of fuel, and rising to and fitting the top when said fuel tank is filled, thereby acting as a flexible diaphragm to separate fuel from air, and an air vent at the top of said fuel tank to expel air as the tank is filled and to admit air as the fuel level is lowered.

2. The apparatus of claim 1 wherein said fuel tank has a mid-seam, joining an upper portion to a lower portion, and said inner tank is attached adjacent said seam.

3. The apparatus of claim 1 wherein said inner tank has a bottom portion attached throughout its surface to the bottom portion of said fuel tank.

4. The apparatus of claim 3 wherein said fuel tank has bottom outlets and said inner tank is fluid-tightly attached around them.

5. The apparatus of claim 1, wherein the inner tank is constructed in three layers, the two outside members being thin membranes of gasoline-resistant elastomer, and the inner layer, thicker in section, being fabricated of a type of elastomer which absorbs hydrocarbons, thereby swelling and tending to stop leaks if the tank is punctured.

* * * * *